Dec. 12, 1944.  G. A. TINNERMAN  2,364,880
FASTENING DEVICE
Filed Dec. 18, 1943

INVENTOR.
GEORGE A. TINNERMAN
BY
Bates, Teare & McDean
ATTORNEYS

Patented Dec. 12, 1944

2,364,880

UNITED STATES PATENT OFFICE.

2,364,880

FASTENING DEVICE

George A. Tinnerman, Cleveland, Ohio, assignor to Tinnerman Products, Inc., Cleveland, Ohio, a corporation of Ohio Application December 18, 1943, Serial No. 514,791

4 Claims. (Cl. 85—36)

This invention relates to sheet metal fastening devices and particularly to those which have thread-engaging means carried thereby for engaging the shank of a threaded member and cooperating therewith to hold a plurality of parts together.

In many assembly locations, particularly where a long threaded shank is utilized and where it is not convenient to remove the shank because of the desirability of maintaining a predetermined spacing between parts that are engaged thereby, it is desirable to utilize a nut between the parts without necessitating removal thereof from engagement with the shank. All thread engaging members heretofore used have been so made that they had to be moved axially of the threaded shank to effect an assembly operation. Hence, it has not been possible to position a threaded member between two parts without removing the shank from at least one of them so as to provide space for inserting the nut therebetween.

An object of the present invention is to provide a fastening device which is capable of being brought into thread-engaging position onto a shank between two parts positioned thereon without necessitating removal either of the shank or of any of the parts. An additional object is to make a fastening device which can readily be made from sheet metal and which will have a snap fastening engagement with the threaded shank whereby it will be retained on the shank automatically and yet be capable of being attached and withdrawn, as aforesaid.

Figure 1:
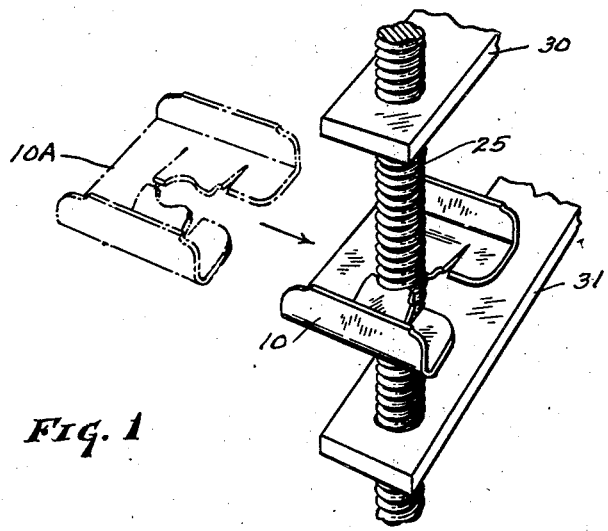
Figure 2:
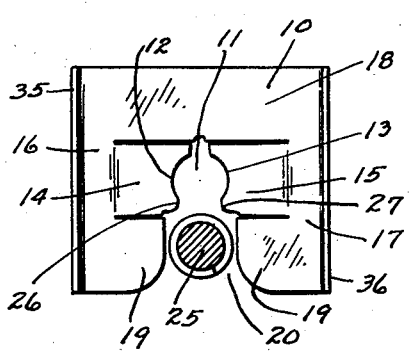
Figure 3:
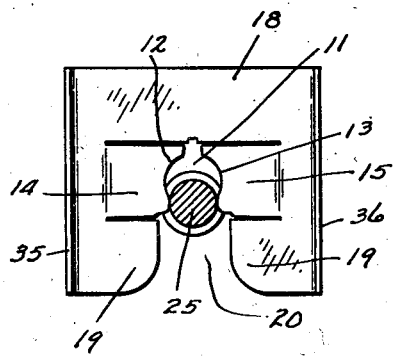
Figure 4:
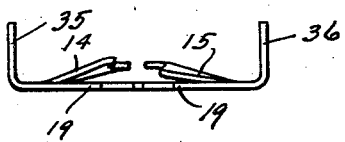

Referring now to the drawing, Fig. 1 is a perspective view of a sheet metal fastening device embodying my invention and showing its applicability to a threaded shank between two parts; Fig. 2 is a horizontal section through the threaded shank and illustrating the fastener in partially applied position; Fig. 3 is a view similar to Fig. 2 and illustrating the fastener in still further applied position, and Fig. 4 is a side view of the fastener.

The fastening device embodying the present invention has a body 10 which is made from sheet metal and which has a shank receiving aperture 11 therein. Shank engaging portions 12 and 13 are disposed adjacent the aperture and preferably comprise the end portions of tongues 14 and 15 which may be formed from the body. Each of the tongues is attached at one end thereof to the body, and where they are adapted to coact with a threaded shank, they are tilted at their free ends to conform to the shape of the thread with which they are to be used.

By forming the tongues 14 and 15 from the mid portion of the body, there are provided end portions 16 and 17 which are connected by a portion 18 which is disposed on one side of the tongues. On the other side of the tongues there are extensions 19 which are spaced apart at their free ends to provide an opening 20 therein in alignment with the aperture 11, whereby a direct passageway for the reception of the shank 25 is provided from one side of the fastener. Where the shank 25 is threaded, the width of the opening is substantially equal to the outside diameter of the thread, whereas the distance across the aperture 11 is substantially equal to the root diameter of the thread. This enables the shank to be quickly inserted in the opening 20 and then to be brought into engagement with the end portions of the tongues.

To facilitate entrance of the shank from the opening 20 to the aperture 11, the tongues have one longitudinal edge portion thereof shorter than the other so as to provide points 26 and 27 which, as shown in Fig. 2, are spaced apart slightly less than the central regions of the portions 12 and 13. This provides a snap-fastening action therefore between the shank and the tongues at the time of insertion of the shank.

In Fig. 1, the dot and dash lines 10A illustrate the position of the fastener before it is applied to the shank 25, and the arrow shows the direction of movement of the fastener into applied position on the shank between the parts 30 and 31, respectively. It is understood that the application of the fastener to the shank can be made without removing the shank from the support or without disturbing the relative position of the parts with respect to the shank. If desired, the end portions 35 and 36 of the body may be turned upwardly for any suitable purpose, such as, wrench receiving shoulders by means of which the fastener may be turned with respect to the shank.

A fastening device made in accordance with the present invention is advantageous in that it can be brought into shank engaging position by movement thereof in its own plane and at a right angle to the axis of the shank. By making the device of sheet metal and utilizing flexible tongues which are carried by the device, a threaded connection may be made with the shank by means of a snap-fastening action that securely holds the fastener in place during the tightening operation.

I claim:

1. A fastening device comprising a strip of sheet metal having an aperture therein and having a pair of tongues deformed therefrom in opposition to each other and having the ends thereof shaped to conform to the helix of a thread on a fastening member that is adapted to extend through said aperture, said tongues and strip having laterally extending openings in alignment with the aperture for enabling the device to be applied to a threaded member by sidewise movement of the device with respect to the member.

2. A fastening device comprising a strip of sheet metal having an aperture therein and having a pair of opposed tongues deformed therefrom and movable with respect thereto, the ends of said tongues being shaped to conform to the helix of the threaded member that is adapted to extend through the aperture, said tongues having the longitudinal edges on one side thereof closer together than those on the other side, the distance between the farther removed ends being less than the root diameter of said threaded member, but large enough to admit the member by flexing of the tongues so as to make a snap-fastening engagement between the tongues and threaded member, and said body having an opening on the side thereof adjacent said farthest removed ends of the tongues, said opening on the body portion being larger than the outside diameter of the threads on said member.

3. A fastening device comprising a body of sheet metal having a bolt-receiving aperture therein and having a pair of opposed tongues deformed therefrom, the ends of said tongues being notched and having the greatest distance between the notched portions substantially equal to the root diameter of the thread on said bolt, said body having a portion on one side of said tongues extending continuously from one end thereof to the other and having extensions on the other side of said tongues, said extensions terminating short of each other by a distance sufficiently to admit the bolt when the fastener is moved sidewise with respect thereto, and said tongues having one side thereof adjacent the notched portions spaced apart a distance slightly less than the root diameter of the threads on the bolt, whereby a snap-fastening engagement may be made between the tongues and the bolt by a sidewise movement of the device with respect to the axis of the bolt.

4. A fastening device comprising a body of sheet metal having an aperture therein for receiving the shank of a threaded member, a pair of tongues partially severed from the body by longitudinal slits and diverted therefrom at oblique angles to the body into a region on the same side of the body, said tongues having the ends thereof shaped to engage the threads on said shank, said tongues and body having lateral openings therein whereby the fastener may be applied to the stud by sidewise movement of the fastener with respect to said shank.

GEORGE A. TINNERMAN.